(12) United States Patent
Li et al.

(10) Patent No.: US 10,991,154 B1
(45) Date of Patent: Apr. 27, 2021

(54) METHOD FOR GENERATING MODEL OF SCULPTURE OF FACE WITH HIGH METICULOUS, COMPUTING DEVICE, AND NON-TRANSITORY STORAGE MEDIUM

(71) Applicant: Ping An Technology (Shenzhen) Co., Ltd., Shenzhen (CN)

(72) Inventors: Minghao Li, Mountain View, CA (US); Jinghong Miao, San Jose, CA (US); Yuchuan Gou, Sunnyvale, CA (US); Bo Gong, Belmont, CA (US); Mei Han, Palo Alto, CA (US)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/729,154

(22) Filed: Dec. 27, 2019

(51) Int. Cl.
*G06T 17/00* (2006.01)
*G06T 19/20* (2011.01)
*G06N 3/08* (2006.01)
*G06N 3/04* (2006.01)

(52) U.S. Cl.
CPC .......... *G06T 17/00* (2013.01); *G06N 3/0454* (2013.01); *G06N 3/08* (2013.01); *G06T 19/20* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 2009/0244082 A1* | 10/2009 | Livingston | G06K 9/4609 345/581 |
| 2015/0049169 A1* | 2/2015 | Krig | H04N 13/211 348/46 |
| 2015/0084950 A1* | 3/2015 | Li | G06K 9/00214 345/419 |
| 2015/0302592 A1* | 10/2015 | Bruls | G06T 7/50 348/44 |
| 2019/0043254 A1* | 2/2019 | Taubin | G06T 15/08 |
| 2019/0096035 A1* | 3/2019 | Li | G06T 3/4053 |
| 2019/0130278 A1* | 5/2019 | Karras | G06N 3/082 |
| 2019/0164341 A1* | 5/2019 | Venkataraman | G06T 7/149 |
| 2019/0171936 A1* | 6/2019 | Karras | G06N 3/0454 |
| 2020/0013212 A1* | 1/2020 | Wang | G06T 15/04 |
| 2020/0051303 A1* | 2/2020 | Li | G06T 17/20 |
| 2020/0105028 A1* | 4/2020 | Gao | G06T 7/50 |
| 2020/0226419 A1* | 7/2020 | Knaan | H04N 5/247 |
| 2020/0380661 A1* | 12/2020 | Qiu | G06N 3/04 |

* cited by examiner

*Primary Examiner* — Jeffrey J Chow
(74) *Attorney, Agent, or Firm* — ScienBizip, P.C.

(57) ABSTRACT

A method for generating a model for facial sculpture based on a generative adversarial network (GAN) includes training a predetermined GAN based on a three-dimensional (3D) face dataset of multiple 3D face images to obtain a curvature map generation model and training a predetermined image translation model based on dataset of multiple image pairs to obtain a height map generation model. Target 3D face data is received, and the target 3D face data is inputted into the curvature map generation model to generate a target curvature map, and the target curvature map is inputted to the height map generation model to generate a target height map. The target height map is performed a 3D reconstruction to obtain a facial sculpture model corresponding to the target 3D face data. A computing device using the method is also provided.

20 Claims, 5 Drawing Sheets

METHOD FOR GENERATING MODEL OF SCULPTURE OF FACE WITH HIGH METICULOUS, COMPUTING DEVICE, AND NON-TRANSITORY STORAGE MEDIUM

FIELD

The subject matter herein generally relates to a technical field of deep learning, specifically a facial sculpture model generating method, a computing device, and a non-transitory storage medium.

BACKGROUND

Generative Adversarial Network (GAN) is applied to numbers of real life situations. For training, GAN has been able to generate various styles of images, such as animal images, landscape images, and portraits of people. However, in the sculpture field, a sculpture model generated by a sculpture generation model based on the GAN is rough, lacks detail, and is not vivid. During generation of the model for sculpture, the GAN puts a heavy load on a computer.

Thus, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
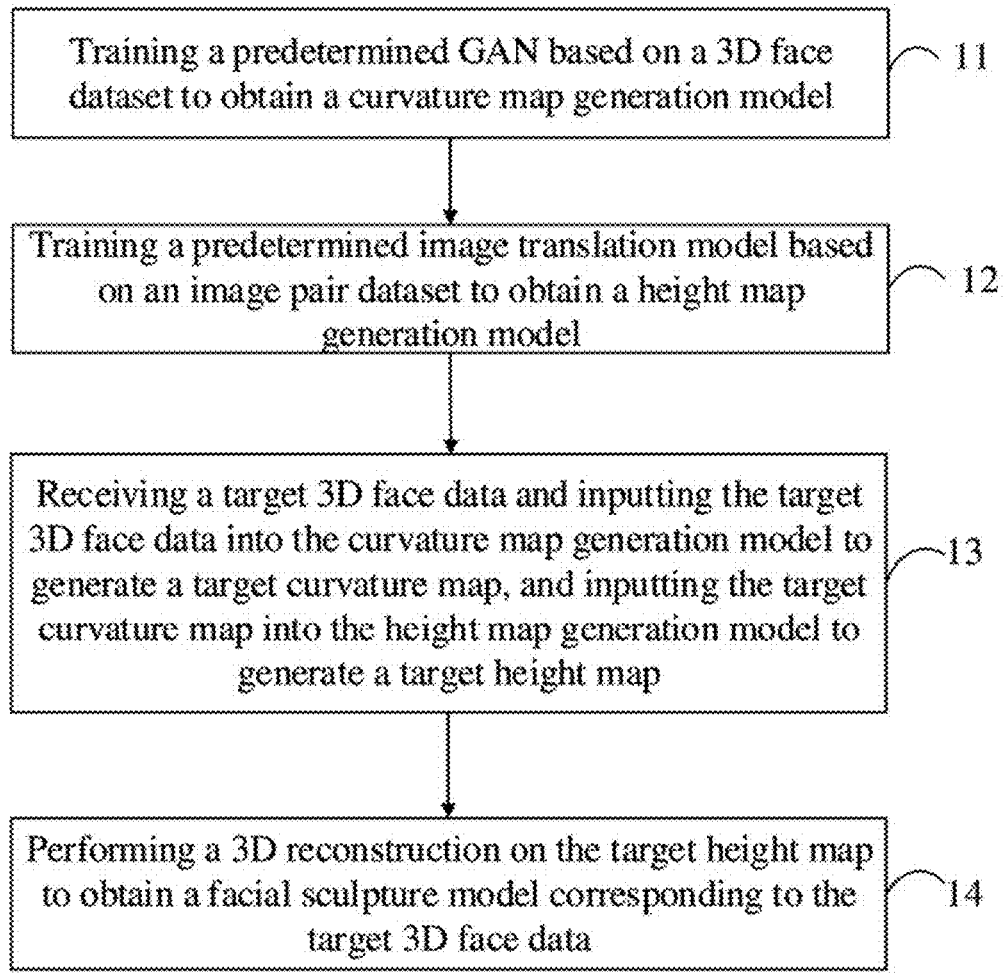
FIG. 1 is a schematic flow chart of an embodiment of a method for generating a model for facial sculpture according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

Terms such as "first", "second" and the like in the specification and in the claims of the present disclosure and the above drawings are used to distinguish between different objects, and are not intended to describe a specific order.

FIG. 1 shows a schematic flow chart of an embodiment of a method for generating a model for facial sculpture according to the present disclosure.

As shown in FIG. 1, the method applicable in a computing device can include the following steps. According to different requirements, the order of the steps in the flow may be changed, and some may be omitted. Within each step, sub-steps may be sub-numbered.

In block 11, a predetermined generative adversarial network (GAN) is trained based on a three dimensional (3D) face dataset to obtain a curvature map generation model.

In one embodiment, the 3D face dataset can be pre-established before model training and stored in a specific storage area/device. The 3D face dataset can comprise 3D face data of multiple 3D face images. The GAN can be a progressive growing GAN (PGGAN). In other embodiments, the GAN can also be other types of GANs.

In one embodiment, when the predetermined GAN is trained based on the 3D face dataset, the 3D face data of each of the multiple 3D face images can be converted into grey scale image data with height information. The grey scale image data with height information is performed a curvature conversion to obtain a distribution map of curvature value corresponding to each of the multiple 3D face images, and the distribution maps of curvature value corresponding to the multiple 3D face images are defined as a training dataset for training the PGGAN. The grey scale image data is two-dimensional (2D) data. The PGGAN being trained based on the 3D face dataset can comprise: converting the 3D face data of each of the multiple 3D face images into the grey scale image data with height information; performing the curvature conversion on the grey scale image data with height information to obtain the distribution map of curvature value corresponding to each of the multiple 3D face images; and training the predetermined GAN based on the distribution maps of curvature value to obtain a curvature map generation network.

In one embodiment, the curvature map generation model can be divided into three parts. A first part of the curvature map generation model can be a 3D-2D conversion unit, a second part of the curvature map generation model can be a curvature value calculation unit, and a third part of the curvature map generation model can be the PGGAN. The 3D-2D conversion unit can convert the 3D face data of each of the multiple 3D face images into the grey scale image data with height information. The curvature value calculation unit can calculate the distribution map of curvature value corresponding to each of the multiple 3D face images based on the grey scale image data with height information.

In one embodiment, the PGGAN can be divided into two parts. A first part of the PGGAN can be a curvature map generation unit and a second part of the PGGAN can be a curvature map discrimination unit. The curvature map generation unit is configured to generate a curvature map according to the distribution map of curvature value. The curvature map discrimination unit is configured to determine whether a quality of generation of the curvature map meets a first predetermined standard. The predetermined standard can be defined according to a practical application, such as the curvature map discrimination unit determining whether a definition of the curvature map generated by the curvature map generation unit meets the predetermined standard.

In one embodiment, the training of the PGGAN comprises: converting the 3D face data of each of the multiple 3D face images into the grey scale image data with height information by the 2D-3D conversion unit; performing the curvature conversion on the grey scale image data with height information to obtain the distribution map of curvature value corresponding to each of the multiple 3D face images by the curvature value calculation unit; inputting the distribution maps of curvature value to the curvature map generation unit to obtain multiple curvature maps; determining whether the quality of generation of each of the multiple curvature maps meets the first predetermined standard by the curvature map discrimination unit; counting a generation accuracy rate of the multiple curvature maps based on results of the curvature map discrimination unit; and defining training of PGGAN as the curvature map generation network if the generation accuracy rate of curvature map is greater than a first predetermined threshold. When the generation accuracy rate is greater than the first predetermined threshold, it means that the trained PGGAN does meet model requirements, and the PGGAN training can be ended. When the generation accuracy rate is less than the first predetermined threshold, generation parameters of the curvature map generation unit can be adjusted, and then the adjusted PGGAN is used for retraining through the distribution maps of curvature value until the generation accuracy rate is greater than the first predetermined threshold.

In one embodiment, the first predetermined threshold can be defined and adjusted according to a practical application. For example, the first predetermined threshold is defined as ninety-six percent.

In one embodiment, the multiple 3D face images of the 3D face dataset comprise different resolutions, and the PGGAN can be trained through a phased training method with different image resolutions. The PGGAN being trained based on the 3D face dataset can comprise: inputting the 3D face data in order of the image resolutions from low to high into the predetermined GAN for training. For example, the image resolutions of the multiple 3D face images of the 3D face dataset comprise 4*4, 8*8, 16*16, . . . , 512*512, 1024*1024. The PGGAN can be trained by using from 4*4 resolution images to 1024*1024 resolution images, and the curvature map generation model can have an ability to generate high-definition face curvature maps.

In one embodiment, a curvature value is a physical quantity of a degree of a curve or a curved surface. A curvature value of a straight line is defined as zero.

In one embodiment, a 3D face image can be defined as a 3D curved surface. The curvature value of the 3D face image can represent height change information of a 3D face. For example, curvature values of a nose area are relatively large, and curvature values of a forehead are relatively small. An arbitrary point P1 of the 3D curved surface can be defined as coordinates (x, y, f(x, y)) of a 3D coordinate system, where x represents a coordinate value of the X-axis of the 3D coordinate system, y represents a coordinate value of the Y-axis of the 3D coordinate system, and f(x, y) represents a coordinate value of the Z-axis of the 3D coordinate system. A curvature value of the point P1(x, y, f(x, y)) can be calculated by the curvature value calculation unit through an average curvature calculation algorithm, the curvature value of the point P1(x, y, f(x, y)) calculated based on the average curvature calculation algorithm can comprise: selecting a predetermined area centered on the point P1(x, y, f(x, y)); and estimating the curvature value of the point P1(x, y, f(x, y)) based on points of the predetermined area. A formula f1 for calculating the curvature value of the point P1(x, y, f(x, y)) can comprise:

$$H(x,y)=(1+f_y^2)f_{xx}-2f_xf_yf_{xy}+(1+f_x^2)f_{yy}/2(1+f_x^2+f_y^2)^{3/2};$$

in the formula f1, $f_x$ represents a first derivative in a X-axis direction, $f_{xx}$ represents a second derivative in the X-axis direction, $f_y$ represents a first derivative in a Y-axis direction, $f_{yy}$ represents a second derivative in the Y-axis direction, and $f_{xy}$ represents a mixed derivative in the X-axis direction and the Y-axis direction.

The calculation methods for the derivatives in the formula f1 can include: selecting a predetermined area centered on the point P1(x, y, f(x, y)), wherein the predetermined area comprises k*k points and k represents a size of a curvature filter operator; and using approximation of higher-order polynomials f2 to solve. The higher-order polynomials f2 can comprise:

$$g_{ij}(x,y)=a_{ij}+b_{ij}(x-x_i)+c_{ij}(y-y_j)+d_{ij}(x-x_i)(y-y_j)+e_{ij}(x-x_i)^2+f_{ij}(y-y_j)^2;$$

in the higher-order polynomials f2, i=1, 2, . . . , N, j=1, 2, . . . , M; a, b, c, d, e, and f represent polynomial fitting parameters, a, b, c, d, e, and f can be constant terms; mathematic relations between the parameters of b, c, d, e, and f and the derivatives of formula f1 are shown in a formula f5. N represents a length of the grey scale image with height information corresponding to each of the multiple 3D face images, and M represents a width of the grey scale image with height information corresponding to each of the multiple 3D face images. In other embodiments, the parameters of a, b, c, d, e, and f can be obtained by a least squares fitting of the curved surface.

In one embodiment, the higher-order polynomials f2 can be solved in a matrix form to obtain a formula f3, the formula f3 can comprise:

$$[a,b,c,d,e,f]^T=GA(A^TA)^{-1};$$

in the formula f3, G represents a row vector formed by numerical values of the k*k points, A represents a matrix formed by relative position information of the k*k points, $A^T$ represents a transposed matrix of the matrix A, $A^{-1}$ represents an inverse matrix of the matrix A, and $C=A(A^TA)^{-1}$ and C is defined to the curvature filter operator. A convolution operation of the curvature filter operator C and the grey scale image with height information can obtain six parameter matrices A1, B1, C1, D1, E1, and F1, as shown in formula f4. Each parameter matrix A1~F1 corresponds to distribution information of each parameter a~f on the grey scale image with height information. The formula f4 can be: $[A1, B1, C1, D1, E1, F1]^T=IMG \circledast C$. In the formula f4, IMG represents the grey scale image with height information, A1 represents a parameter matrix formed by the parameter a, a size of the parameter matrix A1 can be equal to the length and width of the grey scale image with height information, and a value of each pixel is a value of a polynomial fitting parameter of the point. Similarly, B1 represents a parameter matrix formed by the parameter b, C1 represents a parameter matrix formed by the parameter c, D1 represents a parameter matrix formed by the parameter d, E1 represents a parameter matrix formed by the parameter e, and F1 represents a parameter matrix formed by the parameter f. The mathematical relations between the parameters of b, c, d, e, and f and the derivatives of formula f1 are shown in the formula f5, the formula f5 can comprise: $f_x(x_i,y_j)=b_{ij}$, $f_y(x_i,y_j)=c_{ij}$, $f_{xy}(x_i,y_j)=d_{ij}$, $f_{xx}(x_i,y_j)=2e_{ij}$, $f_{yy}(x_i,y_j)=2f_{ij}$.

Figure 2A:
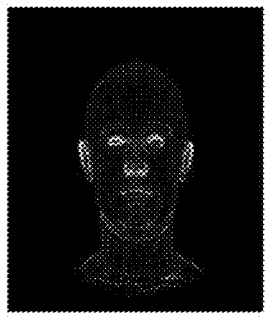
FIGS. 2A-2C are distribution maps, used in the method, of curvature values corresponding to different sizes of curvature filter operators of an embodiment.
Figure 2B:
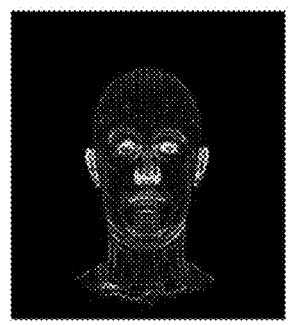
Figure 2C:

The six parameter matrices A1-F1 of the formula f4 can be substituted into the formula f5 and the formula f1. Then, the curvature value of the point P1(x, y, f(x, y)) can be calculated. In the above calculation process of the curvature value of point P1(x, y, f(x, y)), the parameter k can be configured in advance. A value of k*k represents the number of points around the point P1(x, y, f(x, y)) which are used to estimate the curvature value of point P(x, y, f(x, y)) in the above calculation process. The larger the value of k*k, the more sensitive it will be to large curvature information in a distribution map of curvature value. The brighter area in the distribution map of curvature value represents the larger curvature value. The distribution map of curvature value corresponding to curvature filter operators of different sizes are shown in FIGS. 2A-2C. In FIG. 2A, k=7; in FIG. 2B, k=11; and in FIG. 2C, k=21. As shown in FIG. 2C, because curvature values near the nose area of the model are larger, areas near the nose are brighter.

Similarly, other points on the 3D curved surface can also be calculated by the curvature value calculation unit through the above calculation process to obtain a curvature value. Then, the distribution map of curvature value corresponding to the 3D face image can be obtained based on the curvature values of each point of the 3D curved surface.

It can be understood that, a 3D face image can be converted into a grey scale image with height information, and 3D face data can be converted into grey scale image data with height information.

In block 12, a predetermined image translation model is trained based on an image pair dataset to obtain a height map generation model.

In one embodiment, the predetermined image translation model can be a current pix2pixHD model, and the current pix2pixHD model can be retrained though the image pair dataset to obtain the height map generation model. The image pair dataset can also be pre-established before model training and stored in a specific storage area/device. The image pair dataset can comprise multiple image pairs, and each of the multiple image pairs can comprise a height map and a curvature map of a sculpture model. For example, the image pair dataset comprises ten thousands image pairs, and each image pair comprises a face height map and a face curvature map of a sculpture model. The pix2pixHD model can be trained to obtain the height map generation model through ten thousands face height maps and ten thousands face curvature maps.

Figure 3A:
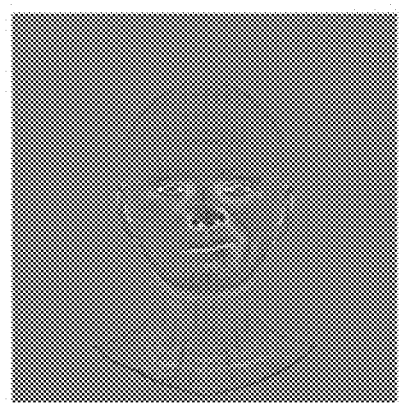
FIG. 3A is a face curvature map generated in the method by a curvature map generation model of an embodiment.
Figure 3B:
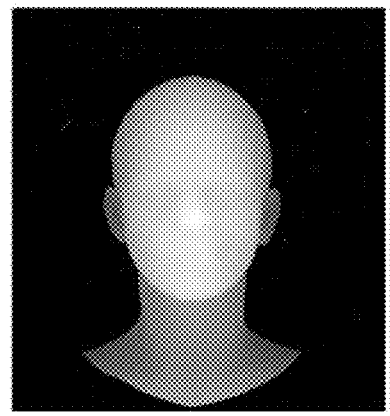
FIG. 3B is a face height map generated in the method by inputting the face curvature map of FIG. 3A to a height map generation model of an embodiment.

The pix2pixHD model can be used for image translation. The pix2pixHD model can translate simple images (such as semantic segmentation maps, object contour maps, etc.) into complex images. The input of the trained pix2pixHD model is a face curvature map and the output of the trained pix2pixHD model is a face height map. The face height map can be the grey scale image with height information. The trained pix2pixHD model can be configured to fill the face curvature map (as shown in FIG. 3A) to obtain the face height map (as shown in FIG. 3B).

In other embodiment, the predetermined image translation model may be other translation models, such as a pix2pix model.

In one embodiment, the pix2pixHD model can comprise a height map generation unit and a height map discrimination unit. The height map generation unit can comprise a residual network, and the residual network can comprise multiple residual blocks. The height map generation unit is configured to fill the curvature maps of the multiple 3D face images to obtain multiple height maps. The height map discrimination unit is configured to determine whether a quality of the height map meets a second predetermined standard to count a generation accuracy rate of height map based on each of the multiple height maps filled by the height map generation unit and each height map comprised in each image pair. The second predetermined standard can be defined according to a practical application, such as the height map discrimination unit determining whether a difference between an image fineness of the height map generated by the height map generating unit and an image fineness of the height map of the image pair is within an acceptable range.

In one embodiment, when the generation accuracy rate of height map is greater than the second predetermined threshold, it means that the trained pix2pixHD does meet model requirements, the pix2pixHD training can be ended, and the trained pix2pixHD can be defined as the height map generation model. When the generation accuracy rate of height map is less than the second predetermined threshold, generation parameters of the height map generation unit can be adjusted, and then the adjusted pix2pixHD is retrained through the curvature maps of the multiple 3D face images until the generation accuracy rate of height map is greater than the second predetermined threshold.

In one embodiment, the second predetermined threshold can also be defined and adjusted according to the practical application.

In block 13, a target 3D face data is received and the target 3D face data is inputted into the curvature map generation model to generate a target curvature map, and inputting the target curvature map into the height map generation model to generate a target height map.

In one embodiment, when the curvature map generation model and the height map generation model are trained, the target 3D face data can be received and inputted to the curvature map generation model, and the curvature map generation model can generate the target curvature map. The target curvature map can be inputted to the height map generation model, and the height map generation model can generate the target height map.

In block 14, a 3D reconstruction is performed on the target height map to obtain a facial sculpture model corresponding to the target 3D face data.

Figure 3C:
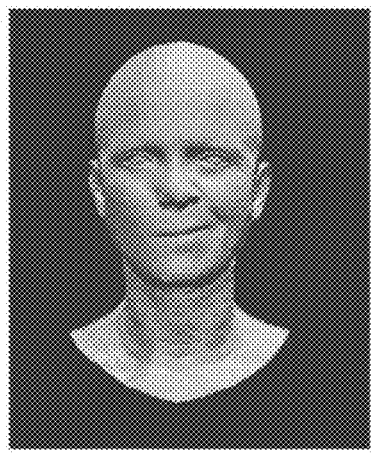
FIG. 3C is a facial sculpture model generated in the method by a three-dimensional reconstruction of the face height map of FIG. 3B of an embodiment.

In one embodiment, when the target height map is generated, the target height map can be performed the 3D reconstruction through a predetermined 3D reconstruction network to obtain the facial sculpture model (as shown in FIG. 3C). The predetermined 3D reconstruction network can be divided into a dimension extension unit and a marching cubes (MC) algorithm extraction unit.

In one embodiment, the target height map can be a 2D grey scale image with height information, the 3D reconstruction of the target height map can comprise: performing the dimension extension on the target height map to map height information of the target height map to a third dimension to convert the target height map to a two-point-five-dimensional (2.5D) height map (comprising data as to three dimensions); extracting multiple iso-surfaces from the 2.5D height map through the MC algorithm; and reconstructing the facial sculpture model based on the multiple iso-surfaces.

In one embodiment, the extraction of the multiple iso-surfaces can comprise: extracting the multiple iso-surfaces from a 2.5D discrete data field of the 2.5D height map through the MC algorithm, to obtain point coordinates and surfaces of the facial sculpture model in a 3D coordinate system, wherein the point coordinates and the surfaces can respectively represent vertices and faces of the facial sculpture model; and reconstructing the facial sculpture model based on the point coordinates and the surfaces of the facial sculpture model. The facial sculpture model can be opened by a 3D visualization software, such as a ParaView software, or a MeshLab software.

In one embodiment, the extraction of the multiple iso-surfaces from the 2.5D discrete data field of the 2.5D height map to establish the facial sculpture model is as follows.

In the 2.5D discrete data field, the iso-surfaces can be approximated by a linear interpolation algorithm. Each grid in the 2.5D discrete data field can be defined as a voxel (the voxel can be a cuboid composed of eight vertices). Each vertices of the voxel corresponds to a scalar value. If a scalar value of a vertex of the voxel is greater than or equal to a iso-surface value, the vertex is defined as being outside of the iso-surface and is labeled as "0". If a scalar value of a vertex of the voxel is less than the iso-surface value, the vertex is defined as being inside of the iso-surface and is labeled as "1". Because each voxel comprises eight vertices, the voxel can comprise 256 ($2^8$=256) label results. All voxels of the 2.5D discrete data field can be processed one by one, the processing of the voxel can comprise: giving a predetermined value to a ios-surface and comparing the predetermined value of the ios-surface with a scalar value of each vertices of a voxel; finding voxels that intersect with the iso-surface based on comparisons; calculating intersections between the iso-surface and edges of the voxel through an interpolation algorithm, wherein the intersections can be connected to a triangle to form an iso-surface patch. A triangle set of all voxels can form an iso-surface set. All iso-surfaces of the iso-surface set can be combined to generate a surface of the facial sculpture model.

Figure 4:
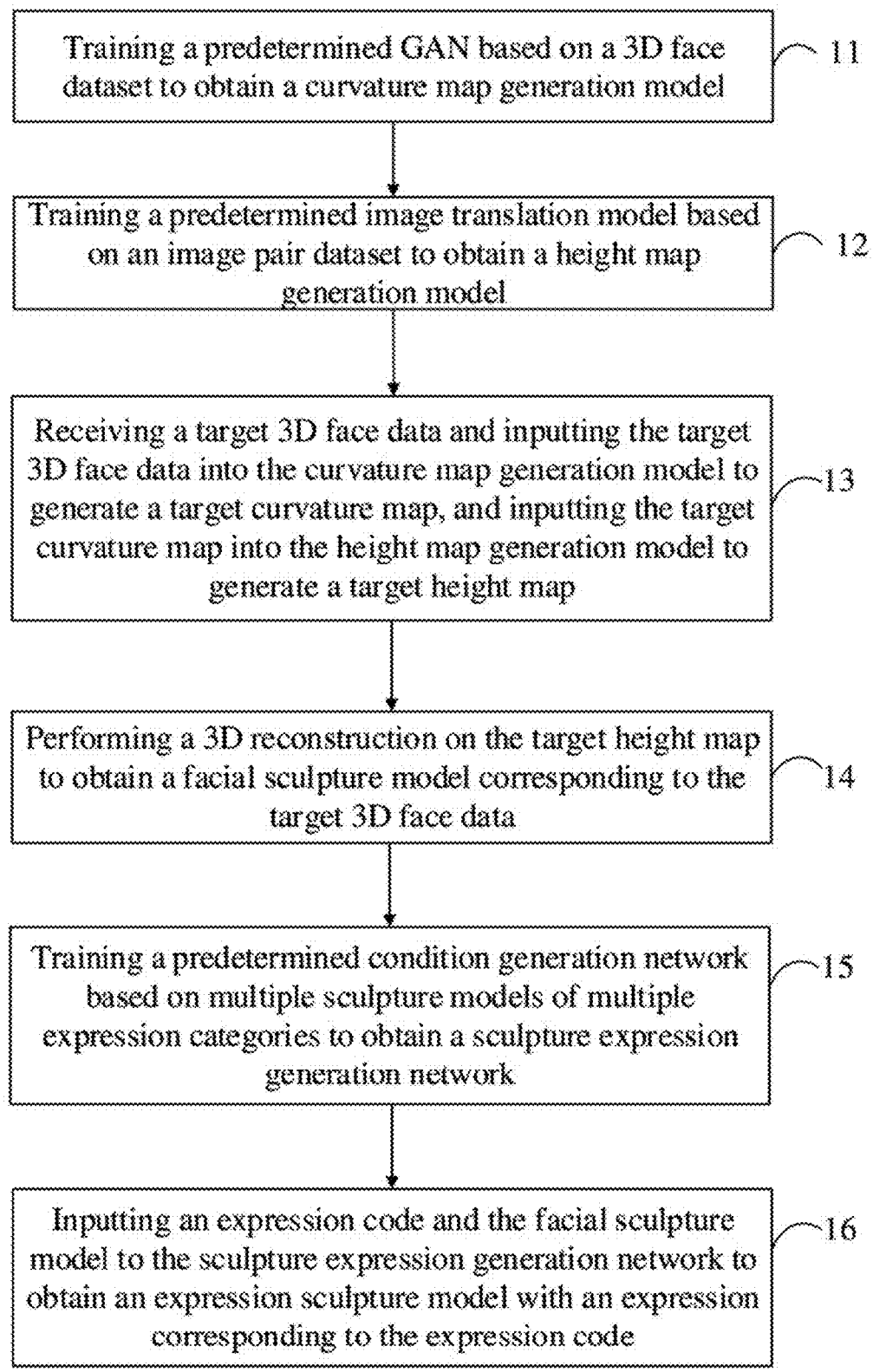
FIG. 4 is a schematic flow chart of an embodiment of another method for generating a model for facial sculpture according to the present disclosure.

FIG. 4 shows a schematic flow chart of another embodiment of a facial sculpture model generating method according to the present disclosure.

As shown in FIG. 4, the method applicable in the computing device can further include a step 15 and a step 16. According to different requirements, the order of the steps in the flow may be changed, and some may be omitted. Within each step, sub-steps may be sub-numbered.

In block 15, a predetermined condition generation network is trained based on multiple sculpture models of multiple expression categories to obtain a sculpture expression generation network.

In one embodiment, human expressions are divisible into 12 categories for example, surprise, disgust, anger, fear, sadness, pleasure, disdain, longing, satisfaction, laughter, doubt, and smiling. Training data of the predetermined condition generation network may be multiple 3D sculpture models. Each 3D sculpture model may comprise multiple expression categories, such as the above-mentioned 12 expressions. The training data can be divided into 12 categories, each category of training data corresponds to an expression category. Facial feature points which can be used to represent the expression of the sculpture model are extracted as training data to train the predetermined condition generation network to obtain the sculpture expression generation network. The facial feature points can be points of parts of the face, such as eyebrows, lips, eyes, and jaw.

For example, the facial feature points comprise ten points of a chin, five points of a left eyebrow, four points of a bridge of a nose, five points of a tip of the nose, five points of a left eye, six points of a right eye, ten points of a upper lip, and eight points of a lower lip. A training process of the predetermined condition generation network can comprise: dividing the training data into 12 expression categories, and adding a unique expression code to each expression category, such as expression 1, expression 2, expression 3, etc.; then training the predetermined condition generating network through the 12 types of expression data. In the training process of the predetermined condition generation network, it is necessary to determine whether an expression of the sculpture expression generation network is similar to corresponding training data, and further to determine whether the expression and the corresponding training data belong to the same facial expression category.

In other embodiments, the number of the expression categories can be divided according to a practical application, and the number of the expression categories can be more or less than 12.

In block 16, an expression code and the facial sculpture model is inputted to the sculpture expression generation network to obtain an expression sculpture model with an expression corresponding to the expression code.

In one embodiment, when the sculpture expression generation network is trained, a user can provide an expression code of an expected sculpted expression, and the expression code can be inputted to the sculpture expression generation network, the sculptural expression generation network can automatically generate an expression sculpture model corresponding to the expression code.

In one embodiment, when the sculpture expression generation network receive an expression code inputted by the user, the facial sculpture model is inputted to the sculpture expression generation network. The sculpture expression generation network can generate an expression sculpture model with an expression corresponding to the expression code. For example, the expression code "1" is an expression of surprise, so the expression code inputted by the user is the expression code "1", and the sculpture expression generation network can generate a facial sculpture model with an expression of surprise.

In one embodiment, the curvature map generation model, the height map generation model, the predetermined 3D reconstruction network, and the sculpture expression generation network can be integrated and configured to an end-to-end model, and the end-to-end model can provide an operation interface for the user. Then, the user can input the target 3D face data and the expression code of the target facial sculpture model, and the end-to-end model can automatically generate corresponding facial sculpture model.

The facial sculpture model generating method provided by embodiments of the present disclosure can generate facial sculpture models with various expressions. Such facial sculpture models with high artistic value, are very smooth, are meticulous, and provide vivid sculptures. The method solves problems of low resolution, poor smoothness, and heavy use of computing resources in current generation process of 3D sculpture model.

Figure 5:
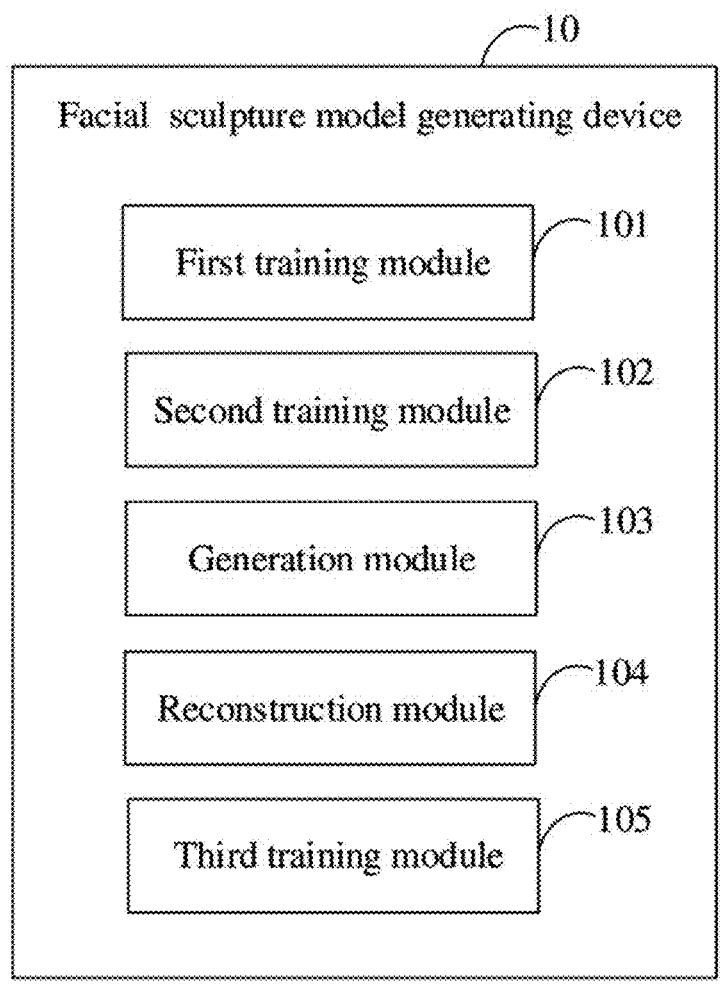
FIG. 5 is a schematic structural diagram of an embodiment of a device for generating a model for facial sculpture according to the present disclosure.

FIG. 5 shows a schematic structural diagram of an embodiment of a device for generating a model of a facial sculpture according to the present disclosure.

In one embodiment, the facial sculpture model generating device (device 10) can include a plurality of function modules consisting of program code segments. The program code of each program code segments in the device 10 may be stored in a memory of a computing device and executed by the at least one processor to perform a function of generating facial sculpture models as described in detail in FIG. 1.

In an embodiment, the device 10 can be divided into a plurality of functional modules, according to the performed functions. The functional module can include: a first training module 101, a second training module 102, a generation module 103, a reconstruction module 104, and a third training module 105. A module as referred to in the present disclosure refers to a series of computer program segments that can be executed by at least one processor and that are capable of performing fixed functions, which are stored in a memory. In this embodiment, the functions of each module will be detailed in the following embodiments.

The first training module 101 is configured to train a predetermined GAN based on a 3D face dataset to obtain a curvature map generation model.

In one embodiment, the 3D face dataset can be pre-established before model training and stored in a specific storage area/device. The 3D face dataset can comprise 3D face data of multiple 3D face images. The GAN can be a PGGAN. In other embodiments, the GAN can also be other types of GANs.

In one embodiment, when the predetermined GAN is trained by the first training module 101 based on the 3D face dataset, the 3D face data of each of the multiple 3D face images can be converted into grey scale image data with height information. The grey scale image data with height information is performed a curvature conversion to obtain a distribution map of curvature value corresponding to each of the multiple 3D face images, and the distribution maps of curvature value corresponding to the multiple 3D face images are defined as a training dataset for training the PGGAN. The grey scale image data is 2D data. The first training module 101 training the PGGAN based on the 3D face dataset can comprise: converting the 3D face data of each of the multiple 3D face images into the grey scale image data with height information; performing the curvature conversion on the grey scale image data with height information to obtain the distribution map of curvature value corresponding to each of the multiple 3D face images; and training the predetermined GAN based on the distribution maps of curvature value to obtain a curvature map generation network.

In one embodiment, the curvature map generation model can be divided into three parts. A first part of the curvature map generation model can be a 3D-2D conversion unit, a second part of the curvature map generation model can be a curvature value calculation unit, and a third part of the curvature map generation model can be the PGGAN. The 3D-2D conversion unit can convert the 3D face data of each of the multiple 3D face images into the grey scale image data with height information. The curvature value calculation unit can calculate the distribution map of curvature value corresponding to each of the multiple 3D face images based on the grey scale image data with height information.

In one embodiment, the PGGAN can be divided into two parts. A first part of the PGGAN can be a curvature map generation unit and a second part of the PGGAN can be a curvature map discrimination unit. The curvature map generation unit is configured to generate a curvature map according to the distribution map of curvature value. The curvature map discrimination unit is configured to determine whether a quality of generation of the curvature map meets a first predetermined standard. The predetermined standard can be defined according to a practical application, such as the curvature map discrimination unit determining whether a definition of the curvature map generated by the curvature map generation unit meets the predetermined standard.

In one embodiment, the first training module 101 training the PGGAN can comprise: converting the 3D face data of each of the multiple 3D face images into the grey scale image data with height information by the 2D-3D conversion unit; performing the curvature conversion on the grey scale image data with height information to obtain the distribution map of curvature value corresponding to each of the multiple 3D face images by the curvature value calculation unit; inputting the distribution maps of curvature value to the curvature map generation unit to obtain multiple curvature maps; determining whether the quality of generation of each of the multiple curvature maps meets the first predetermined standard by the curvature map discrimination unit; counting a generation accuracy rate of the multiple curvature maps based on determination of the curvature map discrimination unit; and defining training of PGGAN as the curvature map generation network if the generation accuracy rate of curvature map is greater than a first predetermined threshold. When the generation accuracy rate is greater than the first predetermined threshold, it means that the trained PGGAN does meet model requirements, and the PGGAN training can be ended. When the generation accuracy rate is less than the first predetermined threshold, generation parameters of the curvature map generation unit can be adjusted, and then the adjusted PGGAN is used for retraining through the distribution maps of curvature value until the generation accuracy rate is greater than the first predetermined threshold.

In one embodiment, the first predetermined threshold can be defined and adjusted according to a practical application. For example, the first predetermined threshold is defined as ninety-six percent.

In one embodiment, the multiple 3D face images of the 3D face dataset comprises different resolutions, and the PGGAN can be trained by the first training module 101 through a phased training method with different image resolutions. The PGGAN being trained by the first training module 101 based on the 3D face dataset can comprise: inputting the 3D face data of the 3D face dataset in the order of image resolutions from low to high into the predetermined GAN for training. For example, the image resolutions of the multiple 3D face images of the 3D face dataset comprise 4*4, 8*8, 16*16, . . . , 512*512, 1024*1024. The PGGAN can be trained by using from 4*4 resolution images to 1024*1024 resolution images, and the curvature map generation model can have an ability to generate high-definition face curvature maps.

In one embodiment, a curvature value is a physical quantity of a degree of a curve or a curved surface. A curvature value of a straight line is defined as zero.

In one embodiment, a 3D face image can be defined as a 3D curved surface. The curvature value of the 3D face image can represent height change information of a 3D face. For example, curvature values of a nose area are relatively large, and curvature values of a forehead are relatively small. An arbitrary point P1 of the 3D curved surface can be defined as coordinates (x, y, f(x, y)) of a 3D coordinate system, where x represents a coordinate value of the X-axis of the 3D coordinate system, y represents a coordinate value of the Y-axis of the 3D coordinate system, and f(x, y) represents a coordinate value of the Z-axis of the 3D coordinate system. A curvature value of the point P1(x, y, f(x, y)) can be calculated by the curvature value calculation unit through an average curvature calculation algorithm, the curvature value of the point P(x, y, f(x, y)) calculated based on the average curvature calculation algorithm can comprise: selecting a predetermined area centered on the point P1(x, y, f(x, y)); and estimating the curvature value of the point P1(x, y, f(x, y)) based on points of the predetermined area. A formula f1 for calculating the curvature value of the point P1(x, y, f(x, y)) can comprise:

$$H(x,y)=(1+f_y^2)f^{xx}-2f_xf_yf_{xy}+(1+f_x^2)f_{yy}/2(1+f_x^2+f_y^2)^{3/2};$$

in the formula f1, $f_x$ represents a first derivative in a X-axis direction, $f_{xx}$ represents a second derivative in the X-axis direction, $f_y$ represents a first derivative in a Y-axis direction, $f_{yy}$ represents a second derivative in the Y-axis direction, and $f_{xy}$ represents a mixed derivative in the X-axis direction and the Y-axis direction.

The calculation methods for the derivatives in the formula f1 can include: selecting a predetermined area centered on the point P1(x, y, f(x, y)), wherein the predetermined area comprises k*k points and k represents a size of a curvature filter operator; and using approximation of higher-order polynomials f2 to solve. The higher-order polynomials f2 can comprise:

$$g_{ij}(x,y)=a_{ij}+b_{ij}(x-x_i)+c_{ij}(y-y_j)+d_{ij}(x-x_i)(y-y_j)+e_{ij}(x-x_i)^2+f_{ij}(y-y_j);$$

in the higher-order polynomials f2, i=1, 2, . . . , N, j=1, 2, . . . , M; a, b, c, d, e, and f represent polynomial fitting parameters, a, b, c, d, e, and f can be constant terms; mathematic relations between the parameters of b, c, d, e, and f and the derivatives of formula f1 are shown in a formula f5. N represents a length of the grey scale image with height information corresponding to each of the multiple 3D face images, and M represents a width of the grey scale image with height information corresponding to each of the multiple 3D face images. In other embodiments, the parameters of a, b, c, d, e, and f can be obtained by a least squares fitting of the curved surface.

In one embodiment, the higher-order polynomials f2 can be solved in a matrix form to obtain a formula f3, the formula f3 can comprise: $[a, b, c, d, e, f]^T=GA(A^TA)^{-1}$; in the formula f3, G represents a row vector formed by numerical values of the k*k points, A represents a matrix formed by relative position information of the k*k points, $A^T$ represents a transposed matrix of the matrix A, $A^{-1}$ represents an inverse matrix of the matrix A, and $C=A(A^TA)^{-1}$ and C is defined to the curvature filter operator. A convolution operation of the curvature filter operator C and the grey scale image with height information can obtain six parameter matrices A1, B1, C1, D1, E1, and F1, as shown in formula f4. Each parameter matrix A1~F1 corresponds to distribution information of each parameter a-f on the grey scale image with height information. The formula f4 can be: $[A, B1, C1, D1, E1, F1]^T=IMG\circledast C$. In the formula f4, IMG represents the grey scale image with height information, A1 represents a parameter matrix formed by the parameter a, a size of the parameter matrix A1 can be equal to the length and width of the grey scale image with height information, and a value of each pixel is a value of a polynomial fitting parameter of the point. Similarly, B1 represents a parameter matrix formed by the parameter b, C1 represents a parameter matrix formed by the parameter c, D1 represents a parameter matrix formed by the parameter d, E1 represents a parameter matrix formed by the parameter e, and F1 represents a parameter matrix formed by the parameter f. The mathematical relations between the parameters of b, c, d, e, and f and the derivatives of formula f1 are shown in the formula f5, the formula f5 can comprise: $f_x(x_i,y_j)=b_{ij}$, $f_y(x_i,y_j)=c_{ij}$, $f_{xy}(x_i,y_j)=d_{ij}$, $f_{xx}(x_i,y_j)=2e_{ij}$, $f_{yy}(x_i,y_j)=2f_{ij}$.

The six parameter matrices A1-F1 of the formula f4 can be substituted into the formula f5 and the formula f1. Then, the curvature value of the point P(x, y, f(x, y)) can be calculated. In the above calculation process, the parameter k can be configured in advance. A value of k*k represents the number of points around the point P1(x, y, f(x, y)) which are used to estimate the curvature value of point P1(x, y, f(x, y)) in the above calculation process. The larger the value of k*k, the more sensitive it will be to large curvature information in a distribution map of curvature value. The brighter area in the distribution map of curvature value represents the larger curvature value. The distribution map of curvature value corresponding to curvature filter operators of different sizes are shown in FIGS. 2A-2C. In FIG. 2A, k=7; in FIG. 2B, k=11; and in FIG. 2C, k=21. As shown in FIG. 2C, because curvature values near the nose area of the model are larger, areas near the nose are brighter.

Similarly, other points on the 3D curved surface can also be calculated by the curvature value calculation unit through the above calculation process to obtain a curvature value. Then, the distribution map of curvature value corresponding to the 3D face image can be obtained based on curvature values of each point of the 3D curved surface.

It can be understood that, a 3D face image can be converted into a grey scale image with height information, and 3D face data can be converted into grey scale image data with height information.

The second training module 102 is configured to train a predetermined image translation model based on an image pair dataset to obtain a height map generation model.

In one embodiment, the predetermined image translation model can be a current pix2pixHD model, and the current pix2pixHD model can be retrained by the second training module 102 though the image pair dataset to obtain the height map generation model. The image pair dataset can also be pre-established before model training and stored in a specific storage area/device. The image pair dataset can comprise multiple image pairs, and each of the multiple image pairs can comprise a height map and a curvature map of a sculpture model. For example, the image pair dataset comprises ten thousands image pairs, and each image pair comprises a face height map and a face curvature map of a sculpture model. The pix2pixHD model can be trained to obtain the height map generation model through ten thousands face height maps and ten thousands face curvature maps.

The pix2pixHD model can be used for image translation. The pix2pixHD model can translate simple images (such as semantic segmentation maps, object contour maps, etc.) into complex images. The input of the trained pix2pixHD model is a face curvature map and the output of the trained pix2pixHD model is a face height map. The face height map can be the grey scale image with height information. The trained pix2pixHD model can be configured to fill the face curvature map (as shown in FIG. 3A) to obtain the face height map (as shown in FIG. 3B).

In other embodiment, the predetermined image translation model may be other translation models, such as a pix2pix model.

In one embodiment, the pix2pixHD model can comprise a height map generation unit and a height map discrimination unit. The height map generation unit can comprise a residual network, and the residual network can comprise multiple residual blocks. The height map generation unit is configured to fill the curvature maps of the multiple 3D face images to obtain multiple height maps. The height map discrimination unit is configured to determine whether a quality of the height map meets a second predetermined standard to count a generation accuracy rate of height map based on each of the multiple height maps filled by the height map generation unit and each height map comprised in each image pair. The second predetermined standard can be defined according to a practical application, such as the height map discrimination unit determining whether a difference between an image fineness of the height map generated by the height map generating unit and an image fineness of the height map of the image pair is within an acceptable range.

In one embodiment, when the generation accuracy rate of height map is greater than the second predetermined threshold, it means that the trained pix2pixHD does meet model requirements, the pix2pixHD training can be ended by the second training module 102, and the trained pix2pixHD can be defined as the height map generation model. When the generation accuracy rate of height map is less than the second predetermined threshold, generation parameters of the height map generation unit can be adjusted by the second training module 102, and then the adjusted pix2pixHD is retrained through the curvature maps of the multiple 3D face images until the generation accuracy rate of height map is greater than the second predetermined threshold.

In one embodiment, the second predetermined threshold can also be defined and adjusted according to the practical application.

The generation module 103 is configured to receive a target 3D face data and input the target 3D face data into the curvature map generation model to generate a target curvature map, and input the target curvature map into the height map generation model to generate a target height map.

In one embodiment, when the curvature map generation model and the height map generation model are trained, the generation module 103 can receive and input the target 3D face data to the curvature map generation model, and the curvature map generation model can generate the target curvature map. The generation module 103 can further input the target curvature map to the height map generation model, and the height map generation model can generate the target height map.

The reconstruction module 104 is configured to perform a 3D reconstruction on the target height map to obtain a facial sculpture model corresponding to the target 3D face data.

In one embodiment, when the target height map is generated, the target height map can be performed the 3D reconstruction through a predetermined 3D reconstruction network to obtain the facial sculpture model (as shown in FIG. 3C). The predetermined 3D reconstruction network can be divided into a dimension extension unit and a MC algorithm extraction unit.

In one embodiment, the target height map can be a 2D grey scale image with height information, the 3D reconstruction of the target height map performed by the reconstruction module 104 can comprise: performing the dimension extension on the target height map to map height information of the target height map to a third dimension to convert the target height map to a 2.5D height map (comprising data as to three dimensions); extracting multiple iso-surfaces from the 2.5D height map through the MC algorithm; and reconstructing the facial sculpture model based on the multiple iso-surfaces.

In one embodiment, the reconstruction module 104 extracting the multiple iso-surfaces can comprise: extracting the multiple iso-surfaces from a 2.5D discrete data field of the 2.5D height map through the MC algorithm, to obtain point coordinates and surfaces of the facial sculpture model in a 3D coordinate system, wherein the point coordinates and the surfaces can respectively represent vertices and faces of the facial sculpture model; and reconstructing the facial sculpture model based on the point coordinates and the surfaces of the facial sculpture model. The facial sculpture model can be opened by a 3D visualization software, such as a ParaView software, or a MeshLab software.

In one embodiment, the extracting of the multiple iso-surfaces from the 2.5D discrete data field of the 2.5D height map to establish the facial sculpture model is as follows.

In the 2.5D discrete data field, the iso-surfaces can be approximated by a linear interpolation algorithm. Each grid in the 2.5D discrete data field can be defined as a voxel (the voxel can be a cuboid composed of eight vertices). Each vertices of the voxel corresponds to a scalar value. If a scalar value of a vertex of the voxel is greater than or equal to a iso-surface value, the vertex is defined as being outside of the iso-surface and is labeled as "0". If a scalar value of a vertex of the voxel is less than the iso-surface value, the vertex is defined as being inside of the iso-surface and is labeled as "1". Because each voxel comprises eight vertices, the voxel can comprise 256 ($2^8$=256) label results. All voxels of the 2.5D discrete data field can be processed one by one, the processing of the voxel can comprise: giving a predetermined value to a ios-surface and comparing the predetermined value of the ios-surface with a scalar value of each vertices of a voxel; finding voxels that intersect with the iso-surface based on comparisons; calculating intersections between the iso-surface and edges of the voxel through an interpolation algorithm, wherein the intersections can be connected to a triangle to form an iso-surface patch. A triangle set of all voxels can form an iso-surface set. All iso-surfaces of the iso-surface set can be combined to generate a surface of the facial sculpture model.

The third training module 105 is configured to train a predetermined condition generation network based on multiple sculpture models of multiple expression categories to obtain a sculpture expression generation network.

In one embodiment, human expressions are divisible into 12 categories for example, surprise, disgust, anger, fear, sadness, pleasure, disdain, longing, satisfaction, laughter, doubt, and smiling. Training data of the predetermined condition generation network may be multiple 3D sculpture models. Each 3D sculpture model may comprise multiple expression categories, such as the above-mentioned 12 expressions. The third training module 105 can divide the training data into 12 categories, each category of training data corresponds to an expression category. Facial feature points which can be used to represent the expression of the sculpture model are extracted as training data to train the predetermined condition generation network to obtain the sculpture expression generation network. The facial feature points can be points of parts of the face, such as eyebrows, lips, eyes, and jaw.

For example, the facial feature points comprise ten points of a chin, five points of a left eyebrow, four points of a bridge of a nose, five points of a tip of the nose, five points of a left eye, six points of a right eye, ten points of a upper lip, and eight points of a lower lip. The third training module 105 training the predetermined condition generation network can comprise: dividing the training data into 12 expression categories, and adding a unique expression code to each expression category, such as expression 1, expression 2, expression 3, etc.; then training the predetermined condition generating network through the 12 types of expression data. In the training process of the predetermined condition generation network, it is necessary to determine whether an expression of the sculpture expression generation network is similar to corresponding training data, and further to determine whether the expression and the corresponding training data belong to the same facial expression category.

In other embodiments, the number of the expression categories can be divided according to a practical application, and the number of the expression categories can be more or less than 12.

The generation module 103 is further configured to input an expression code the facial sculpture model to the sculpture expression generation network to obtain an expression sculpture model with an expression corresponding to the expression code.

In one embodiment, when the sculpture expression generation network is trained, a user can provide an expression code of an expected sculpted expression, and the expression code can be inputted to the sculpture expression generation network, the sculptural expression generation network can automatically generate an expression sculpture model corresponding to the expression code.

In one embodiment, when the generation module 103 receives an expression code inputted by the user, the generation module 103 can input the expression code to the sculpture expression generation network. If the facial sculpture model is inputted to the sculpture expression generation network, the sculpture expression generation network can generate an expression sculpture model with an expression corresponding to the expression code. For example, the expression code "1" is an expression of surprise, the expression code inputted by the user is the expression code "1",and the sculpture expression generation network can generate a facial sculpture model with an expression of surprise.

In one embodiment, the curvature map generation model, the height map generation model, the predetermined 3D reconstruction network, and the sculpture expression generation network can be integrated and configured to an end-to-end model, and the end-to-end model can provide an operation interface for the user. Then, the user can input the target 3D face data and the expression code of the target facial sculpture model, and the end-to-end model can automatically generate corresponding facial sculpture model.

The facial sculpture model generating device provided by embodiments of the present disclosure can generate facial sculpture models with various expressions. Such facial sculpture models with high artistic value, are very smooth, are meticulous, and provide vivid sculptures. The method solves problems of low resolution, poor smoothness, and heavy use of computing resources in current generation process of 3D sculpture model.

Figure 6:
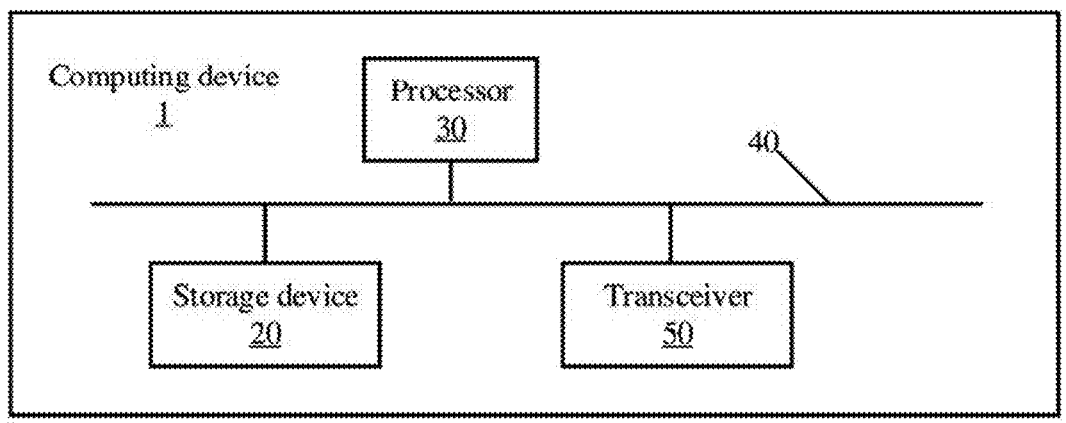
FIG. 6 is a schematic structure of a computing device executing a method according to the present disclosure.

FIG. 6 shows a schematic structural diagram of a computing device according to an embodiment of the present disclosure.

As shown in FIG. 6, the computing device 1 may include: at least one storage device 20, at least one processor 30, at least one communication bus 40, and a transceiver 50.

The structure of the computing device 1 shown in FIG. 6 does not constitute a limitation of the embodiments of the present disclosure. The computing device 1 may be a bus type structure or a star type structure, and the computing device 1 may also include more or less hardware or software than as illustrated, or it may have different component arrangements.

In at least one embodiment, the computing device 1 can include a terminal that is capable of automatically performing numerical calculations and/or information processing in accordance with pre-set or stored instructions. The hardware of the terminal can include, but is not limited to, a microprocessor, an application specific integrated circuit, programmable gate arrays, digital processors, and embedded devices. The computing device 1 may further include an electronic device. The electronic device can interact with a user through a keyboard, a mouse, a remote controller, a touch panel or a voice control device, for example, individual computers, tablets, smartphones, digital cameras, etc.

It should be noted that the computing device 1 is merely an example, other existing examples or future electronic products may be included in the scope of the present disclosure and are included in the reference.

In some embodiments, the at least one storage device 20 stores program codes of computer readable programs and various data, such as the facial sculpture model generating device 10 installed in the computing device 1. The at least one storage device 20 can include a read-only memory (ROM), a programmable read-only memory (PROM), an erasable programmable read only memory (EPROM), an one-time programmable read-only memory (OTPROM), an electronically-erasable programmable read-only memory (EEPROM), a compact disc read-only memory (CD-ROM), or other optical disk storage, magnetic disk storage, magnetic tape storage, or any other non-transitory storage medium readable by the computing device 1 that can be used to carry or store data.

In some embodiments, the at least one processor 30 may be composed of an integrated circuit, for example, may be composed of a single packaged integrated circuit, or may be composed of multiple integrated circuits of same function or different functions. The at least one processor 30 can include one or more central processing units (CPU), a microprocessor, a digital processing chip, a graphics processor, and various control chips. The at least one processor 30 is a control unit of the computing device 1, which connects various components of the computing device 1 using various interfaces and lines. By running or executing a computer program or modules stored in the at least one storage device 20, and by invoking the data stored in the at least one storage device 20, the at least one processor 30 can perform various functions of the computing device 1 and process data of the computing device 1, for example, the at least one processor 30 can execute the generation of the facial sculpture model.

In some embodiments, the least one communication bus 40 achieves intercommunication between the at least one storage device 20 and the at least one processor 30, and other components of the computing device 1.

Although not shown, the computing device 1 may further include a power supply (such as a battery) for powering various components. Preferably, the power supply may be logically connected to the at least one processor 30 through a power management device, thereby, the power management device manages functions such as charging, discharging, and power management. The power supply may include various power sources, a recharging device, a power failure detection circuit, a power converter or inverter, a power status indicator, and the like. The computing device 1 may further include various sensors, such as a BLUETOOTH module, a WI-FI module and the like, and details are not described herein.

It should be understood that the described embodiments are for illustrative purposes only and are not limited by the scope of the present disclosure.

The above-described integrated unit implemented in a form of software function modules can be stored in a computer readable storage medium. The above software function modules are stored in a storage medium, and includes a plurality of instructions for causing a computing device (which may be a personal computer, or a network device, etc.) or a processor to execute the method according to various embodiments of the present disclosure.

In one embodiment, referring to FIG. 5, the at least one processor 30 can execute an operating system and various types of applications (such as the facial sculpture model generating device 10) installed in the computing device 1, program codes, and the like. For example, the at least one processor 30 can execute the modules 101-105.

In at least one embodiment, the at least one storage device 20 stores program codes. The at least one processor 30 can invoke the program codes stored in the at least one storage device 20 to perform related functions. For example, the modules described in FIG. 5 are program codes stored in the at least one storage device 20 and executed by the at least one processor 30, to implement the functions of the various modules.

In at least one embodiment, the at least one storage device 20 stores a plurality of instructions that are executed by the at least one processor 30 to implement all or part of the steps of the method described in the embodiments of the present disclosure.

Specifically, the at least one storage device 20 stores the plurality of instructions which when executed by the at least one processor 30 causes the at least one processor 30 to: train a predetermined GAN based on a 3D face dataset to obtain a curvature map generation model, wherein the 3D face dataset comprises 3D face data of multiple 3D face images; train a predetermined image translation model based on an image pair dataset to obtain a height map generation model, wherein the image pair dataset comprises multiple image pairs, and each of the multiple image pairs comprises a height map and a curvature map of a sculpture model; receive a target 3D face data and input the target 3D face data into the curvature map generation model to generate a target curvature map, and input the target curvature map into the height map generation model to generate a target height map; and perform a 3D reconstruction on the target height map to obtain a facial sculpture model corresponding to the target 3D face data.

Specifically, the at least one processor 30 training the predetermined GAN based on the 3D face dataset comprises:

converting the 3D face data of each of the multiple 3D face images into grey scale image data with height information;

performing a curvature conversion on the grey scale image data with height information to obtain a distribution map of curvature value corresponding to each of the multiple 3D face images; and training the predetermined GAN based on the distribution maps of curvature value to obtain a curvature map generation network. Wherein the predetermined GAN is a PGGAN.

Specifically, the at least one processor 30 training the predetermined GAN based on the distribution maps of curvature value to obtain the curvature map generation network comprises:

inputting the distribution maps of curvature value into the predetermined GAN to generate multiple curvature maps;

determining whether a quality of generation of each of the multiple curvature maps meets a first predetermined standard to count a generation accuracy rate of curvature map; and defining a trained predetermined GAN as the curvature map generation network if the generation accuracy rate of curvature map is greater than a first predetermined threshold.

Specifically, the multiple 3D face images of the 3D face dataset comprises different resolutions, the at least one processor 30 training the predetermined GAN based on the 3D face dataset comprises:

inputting the 3D face data of the 3D face dataset in the order of image resolutions from low to high into the predetermined GAN for training.

Specifically, the at least one processor 30 training the predetermined image translation model based on the image pair dataset to obtain the height map generation model comprises:

inputting the curvature map of each of the multiple image pairs into the predetermined image translation model to fill multiple height maps;

determining whether a quality of the height map filled by the predetermined image translation model meets a second predetermined standard to count a generation accuracy rate of height map based on each height map filled by the predetermined image translation model and each height map comprised in each image pair; and defining a trained predetermined image translation model as the height map generation model if the generation accuracy rate of height map is greater than a second predetermined threshold. Wherein the predetermined image translation model is a pix2pixHD model Specifically, the height map outputted by the height map generation model is a grey scale image with height information, the at least one processor 30 performing the 3D reconstruction on the target height map to obtain the facial sculpture model comprises:

Performing the dimension extension on the target height map to map height information of the target height map to a third dimension to convert the target height map to a 2.5D height map;

extracting multiple iso-surfaces from the 2.5D height map through a MC algorithm; and reconstructing the facial sculpture model based on the multiple iso-surfaces.

Specifically, the at least one processor 30 extracting multiple iso-surfaces from the 2.5D height map through the marching cubes algorithm comprises:

extracting the multiple iso-surfaces from a 2.5D discrete data field of the 2.5D height map through a linear interpolation and the MC algorithm.

Specifically, the at least one processor 30 is further to:

train a predetermined condition generation network based on multiple sculpture models of multiple expression categories to obtain a sculpture expression generation network; and input an expression code and the facial sculpture model to the sculpture expression generation network to obtain an expression sculpture model with an expression corresponding to the expression code.

Such non-transitory storage medium carries instructions that, when executed by a processor of a computing device, causes the computing device to perform a facial sculpture model generating method, the method comprising: training a predetermined GAN based on a 3D face dataset to obtain a curvature map generation model, wherein the 3D face dataset comprises 3D face data of multiple 3D face images; training a predetermined image translation model based on an image pair dataset to obtain a height map generation model, wherein the image pair dataset comprises multiple image pairs, and each of the multiple image pairs comprises a height map and a curvature map of a sculpture model; receiving a target 3D face data and inputting the target 3D face data into the curvature map generation model to generate a target curvature map, and inputting the target curvature map into the height map generation model to generate a target height map; and performing a 3D reconstruction on the target height map to obtain a facial sculpture model corresponding to the target 3D face data.

The embodiments of the above method are expressed as a series of a combination of actions, but those skilled in the art should understand that the present disclosure is not limited by the described action sequence. According to the present disclosure, some steps in the above embodiments can be performed in other sequences or performed simultaneously. Secondly, those skilled in the art should also understand that the embodiments described in the specification are all optional embodiments, and the actions and units involved are not necessarily required by the present disclosure.

In the above embodiments, descriptions of each embodiment have a different focus, and when there is no detail part in a certain embodiment, the relevant parts of other embodiments can be referred to.

In several embodiments provided in the preset application, it should be understood that the disclosed apparatus can be implemented in other ways. For example, the device embodiments described above are merely illustrative. For example, divisions of the unit are only logical function divisions, and there can be other manners of division in actual implementation.

The modules described as separate components may or may not be physically separated, and the components displayed as modules may or may not be physical units. That is, they can be located in one place, or distributed to multiple network units. Some or all of the modules can be selected according to actual needs to achieve the purpose of the method.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

It is apparent to those skilled in the art that the present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims, all changes in the meaning and scope of equivalent elements are to be included in the present disclosure. Any reference signs in the claims should not be construed as limiting the claim.

The above embodiments are only used to illustrate a technical solution and not as restrictions on the technical solution. Although the present disclosure has been described in detail with reference to the above embodiments, those skilled in the art should understand that the technical solutions described in one embodiments can be modified, or some of technical features can be equivalently substituted, and these modifications or substitutions do not detract from the essence of the technical solutions or restrict the scope of the technical solution.

What is claimed is:

1. A method for generating facial sculpture model, the method comprising:

training a predetermined generative adversarial network (GAN) based on a three dimensional (3D) face dataset to obtain a curvature map generation model, wherein the 3D face dataset comprises 3D face data of multiple 3D face images;

training a predetermined image translation model based on an image pair dataset to obtain a height map generation model, wherein the image pair dataset comprises multiple image pairs, and each of the multiple image pairs comprises a first height map and a first curvature map of a sculpture model;

receiving a target 3D face data and inputting the target 3D face data into the curvature map generation model to generate a second curvature map, and inputting the second curvature map into the height map generation model to generate a second height map; and performing a 3D reconstruction on the second height map to obtain a facial sculpture model corresponding to the target 3D face data;

wherein the method of training the predetermined image translation model based on the image pair dataset to obtain the height map generation model comprises:

inputting the first curvature map of each of the multiple image pairs into the predetermined image translation model to fill multiple third height maps;

determining whether a quality of the multiple third height maps filled by the predetermined image translation model meets a second predetermined standard to count a generation accuracy rate of the multiple third height maps based on each third height map filled by the predetermined image translation model and each first height map comprised in each image pair; and defining a trained predetermined image translation model as the height map generation model if the generation accuracy rate of the multiple third height maps is greater than a second predetermined threshold.

2. The method of claim 1, wherein the method of training the predetermined GAN based on the 3D face dataset comprises:

converting the 3D face data of each of the multiple 3D face images into grey scale image data with height information;

performing a curvature conversion on the grey scale image data with height information to obtain distribution maps of curvature value corresponding to each of the multiple 3D face images; and training the predetermined GAN based on the distribution maps of curvature value to obtain a curvature map generation network;

wherein the predetermined GAN is a progressive growing GAN (PGGAN).

3. The method of claim 2, wherein the method of training the predetermined GAN based on the distribution maps of curvature value to obtain the curvature map generation network comprises:

inputting the distribution maps of curvature value into the predetermined GAN to generate multiple third curvature maps;

determining whether a quality of generation of each of the multiple third curvature maps meets a first predetermined standard to count a generation accuracy rate of the third curvature map; and defining a trained predetermined GAN as the curvature map generation network if the generation accuracy rate of the third curvature map is greater than a first predetermined threshold.

4. The method of claim 1, wherein the multiple 3D face images of the 3D face dataset comprise different resolutions, the method of training the predetermined GAN based on the 3D face dataset comprises:

inputting the 3D face data of the 3D face dataset in the order of image resolutions from low to high into the predetermined GAN for training.

5. The method of claim 1, wherein the predetermined image translation model is a pix2pixHD model.

6. The method of claim 1, wherein the second height map outputted by the height map generation model is a grey scale image with height information, the method of performing the 3D reconstruction on the second height map to obtain the facial sculpture model comprises:

performing a dimension extension on the second height map to map height information of the second height map to a third dimension to convert the second height map to a two-point-five-dimensional (2.5D) height map;

extracting multiple iso-surfaces from the 2.5D height map through a marching cubes (MC) algorithm; and reconstructing the facial sculpture model based on the multiple iso-surfaces.

7. The method of claim 6, wherein the method of extracting the multiple iso-surfaces from the 2.5D height map through the MC algorithm comprises:

extracting the multiple iso-surfaces from a 2.5D discrete data field of the 2.5D height map through a linear interpolation and the MC algorithm.

8. The method of claim 1, further comprising:

training a predetermined condition generation network based on multiple sculpture models of multiple expression categories to obtain a sculpture expression generation network; and inputting an expression code and the facial sculpture model to the sculpture expression generation network to obtain an expression sculpture model with an expression corresponding to the expression code.

9. A device for generating facial sculpture model comprising:

at least one processor; and a storage device storing one or more programs which when executed by the at least one processor, causes the at least one processor to:

train a predetermined generative adversarial network (GAN) based on a three-dimensional (3D) face dataset to obtain a curvature map generation model, wherein the 3D face dataset comprises 3D face data of multiple 3D face images;

train a predetermined image translation model based on an image pair dataset to obtain a height map generation model, wherein the image pair dataset comprises multiple image pairs, and each of the multiple image pairs comprises a first height map and a first curvature map of a sculpture model;

receive a target 3D face data and input the target 3D face data into the curvature map generation model to generate a second curvature map, and input the second curvature map into the height map generation model to generate a second height map; and perform a 3D reconstruction on the second height map to obtain a facial sculpture model corresponding to the target 3D face data;

wherein the at least one processor training the predetermined image translation model based on the image pair dataset to obtain the height map generation model comprises:

inputting the first curvature map of each of the multiple image pairs into the predetermined image translation model to fill multiple third height maps;

determining whether a quality of the multiple third height maps filled by the predetermined image translation model meets a second predetermined standard to count a generation accuracy rate of the multiple third height maps based on each third height map filled by the predetermined image translation model and each first height map comprised in each image pair; and defining a trained predetermined image translation model as the height map generation model if the generation accuracy rate of the multiple third height maps is greater than a second predetermined threshold.

10. The device of claim 9, wherein the at least one processor training the predetermined GAN based on the 3D face dataset comprises:

converting the 3D face data of each of the multiple 3D face images into grey scale image data with height information;

performing a curvature conversion on the grey scale image data with height information to obtain distribution maps of curvature value corresponding to each of the multiple 3D face images; and training the predetermined GAN based on the distribution maps of curvature value to obtain a curvature map generation network;

wherein the predetermined GAN is a PGGAN.

11. The device of claim 10, wherein the at least one processor training the predetermined GAN based on the distribution maps of curvature value to obtain the curvature map generation network comprises:

inputting the distribution maps of curvature value into the predetermined GAN to generate multiple third curvature maps;

determining whether a quality of generation of each of the multiple third curvature maps meets a first predetermined standard to count a generation accuracy rate of the third curvature map; and defining a trained predetermined GAN as the curvature map generation network if the generation accuracy rate of the third curvature map is greater than a first predetermined threshold.

12. The device of claim 9, wherein the multiple 3D face images of the 3D face dataset comprise different resolutions, the at least one processor training the predetermined GAN based on the 3D face dataset comprises:

inputting the 3D face data of the 3D face dataset in the order of image resolutions from low to high into the predetermined GAN for training.

13. The device of claim 9, wherein the predetermined image translation model is a pix2pixHD model.

14. The device of claim 9, wherein the second height map outputted by the height map generation model is a grey scale image with height information, the at least one processor performing the 3D reconstruction on the second height map to obtain the facial sculpture model comprises:

performing a dimension extension on the second height map to map height information of the second height map to a third dimension to convert the target height map to a two-point-five-dimensional (2.5D) height map;
extracting multiple iso-surfaces from the 2.5D height map through a marching cubes (MC) algorithm; and
reconstructing the facial sculpture model based on the multiple iso-surfaces.

15. The device of claim 14, wherein the at least one processor extracting the multiple iso-surfaces from the 2.5D height map through the MC algorithm comprises:
extracting the multiple iso-surfaces from a 2.5D discrete data field of the 2.5D height map through a linear interpolation and the MC algorithm.

16. The device of claim 15, wherein the at least one processor is further to:
train a predetermined condition generation network based on multiple sculpture models of multiple expression categories to obtain a sculpture expression generation network; and
input an expression code and the facial sculpture model to the sculpture expression generation network to obtain an expression sculpture model with an expression corresponding to the expression code.

17. A non-transitory storage medium having stored thereon instructions that, when executed by a processor of a computing device, causes the computing device to perform a method for generating facial sculpture model, the method comprising:
training a predetermined generative adversarial network (GAN) based on a three-dimensional (3D) face dataset to obtain a curvature map generation model, wherein the 3D face dataset comprises 3D face data of multiple 3D face images;
training a predetermined image translation model based on an image pair dataset to obtain a height map generation model, wherein the image pair dataset comprises multiple image pairs, and each of the multiple image pairs comprises a first height map and a first curvature map of a sculpture model;
receiving a target 3D face data and inputting the target 3D face data into the curvature map generation model to generate a second curvature map, and inputting the second curvature map into the height map generation model to generate a second height map; and
performing a 3D reconstruction on the second height map to obtain a facial sculpture model corresponding to the target 3D face data;
wherein the method of training the predetermined image translation model based on the image pair dataset to obtain the height map generation model comprises:
inputting the first curvature map of each of the multiple image pairs into the predetermined image translation model to fill multiple third height maps;
determining whether a quality of the multiple third height maps filled by the predetermined image translation model meets a second predetermined standard to count a generation accuracy rate of the multiple third height maps based on each third height map filled by the predetermined image translation model and each first height map comprised in each image pair; and
defining a trained predetermined image translation model as the height map generation model if the generation accuracy rate of the multiple third height maps is greater than a second predetermined threshold.

18. The non-transitory storage medium of claim 17, wherein the method of training the predetermined GAN based on the 3D face dataset comprises:
converting the 3D face data of each of the multiple 3D face images into grey scale image data with height information;
performing a curvature conversion on the grey scale image data with height information to obtain distribution maps of curvature value corresponding to each of the multiple 3D face images; and
training the predetermined GAN based on the distribution maps of curvature value to obtain a curvature map generation network;
wherein the predetermined GAN is a progressive growing GAN (PGGAN).

19. The non-transitory storage medium of claim 18, wherein the method of training the predetermined GAN based on the distribution maps of curvature value to obtain the curvature map generation network comprises:
inputting the distribution maps of curvature value into the predetermined GAN to generate multiple third curvature maps;
determining whether a quality of generation of each of the multiple third curvature maps meets a first predetermined standard to count a generation accuracy rate of the third curvature map; and
defining a trained predetermined GAN as the curvature map generation network if the generation accuracy rate of the third curvature map is greater than a first predetermined threshold.

20. The non-transitory storage medium of claim 17, wherein the predetermined image translation model is a pix2pixHD model.

* * * * *